(12) United States Patent
Fernandez et al.

(10) Patent No.: US 7,052,261 B2
(45) Date of Patent: May 30, 2006

(54) DEVICE FOR MELTING AND REMOLDING CRAYONS

(76) Inventors: Mark S. Fernandez, 229 Summit Ave., San Rafael, CA (US) 94901; Andy O. Stortroen, 245 S. Van Ness, San Francisco, CA (US) 94103

( * ) Notice: Subject to any disclaimer, the term of this patent is extended or adjusted under 35 U.S.C. 154(b) by 0 days.

(21) Appl. No.: 10/615,114

(22) Filed: Jul. 8, 2003

(65) Prior Publication Data

US 2005/0008729 A1    Jan. 13, 2005

(51) Int. Cl.
*B29C 39/24*  (2006.01)
(52) U.S. Cl. ............... 425/136; 425/144; 425/151; 425/173; 425/256; 425/DIG. 57
(58) Field of Classification Search ........... 425/136, 425/144, 151, 173, 256, DIG. 57
See application file for complete search history.

(56) References Cited

U.S. PATENT DOCUMENTS

| 209,154 | A |  | 10/1878 | Bill |  |
|---|---|---|---|---|---|
| 2,025,069 | A | * | 12/1935 | Newton | ............... 164/337 |
| 2,885,727 | A |  | 5/1959 | Wright |  |
| 3,063,109 | A |  | 11/1962 | Rapaport |  |
| D250,426 | S |  | 11/1978 | Behling et al. |  |
| 4,188,009 | A |  | 2/1980 | Gillespie |  |
| 4,299,548 | A | * | 11/1981 | Saffer et al. | ............... 425/173 |
| 5,560,940 | A |  | 10/1996 | Breuil |  |
| D403,378 | S |  | 12/1998 | Lebensfeld et al. |  |
| 5,954,115 | A |  | 9/1999 | Lebensfeld et al. |  |
| 6,033,606 | A |  | 3/2000 | Garza |  |
| 6,098,953 | A |  | 8/2000 | Machado |  |
| 2001/0050449 | A1 |  | 12/2001 | Baxter |  |
| 2003/0107152 | A1 | * | 6/2003 | Cziraky | ............... 264/299 |

* cited by examiner

*Primary Examiner*—Donald Heckenberg
(74) *Attorney, Agent, or Firm*—Michael Best & Friedrich LLP

(57) ABSTRACT

A device suitable for use by children which recycles broken crayons and other materials by melting and molding. A stationary melting pot securely retains the charge material during heating. A housing substantially surrounds the melting pot and an associated mold chamber to isolate young operators from all heated surfaces. The melting pot is charged from outside of the housing by use of a filling port. A remotely operated gate controls the flow from the melting pot to a mold. A door provides access to the mold when open and prevents access to the mold chamber when closed. A warning light glows when a heating element for the melting chamber is energized. Various safety switches interrupt power to the heating element if certain conditions are not met.

21 Claims, 3 Drawing Sheets

DEVICE FOR MELTING AND REMOLDING CRAYONS

TECHNICAL FIELD OF THE INVENTION

The invention relates to toy molding devices for recycling solids having a relatively low melting temperature or melting range.

BACKGROUND OF THE INVENTION

Molding devices for making toys have been popular with children for generations. They can be used to melt and mold waxes, resins, thermoplastics or certain metal alloys to make interesting objects. However, the melting and molding process typically requires a heat source and relatively high temperatures. Although nothing can be completely safe, previous molding toys have not been as simple or as safe as today's parents desire.

U.S. Pat. No. 3,063,109, issued to Rapaport, describes a toy casting machine for melting metal which includes an electrically heated melting chamber. The Rapaport patent reports that the toy casting machine is safe because the melting chamber is covered during operation. However, the path of molten material from a discharge spout to the mold is freely accessible to any child who operates the toy casting machine. If the mold were to overflow, or the molten material were to leak from the mold for any reason, a child operator might impulsively intervene by, for example, placing his or her fingers in the path of the molten material. Also, it is possible that some children will attempt to add additional solid material to the melting chamber during operation.

U.S. Pat. No. 4,299,548, issued to Saffer et al., and U.S. Pat. No. 5,954,115, issued to Lebensfeld et al., describe toy casting machines for melting plastic that include melting chambers rotatably mounted so that they can be tipped to pour molten material into a mold. In both of these patents, the melting chamber and molding area are surrounded by a protective housing. However, rotatably mounted melting chambers are inherently prone to accidental rotation and discharge and are, therefore, undesirable in a toy for children.

U.S. Pat. No. 4,188,009, issued to Gillespie, includes an apparatus for reclaiming broken and worn crayons comprising a radiant and convective heat supply in the form of an electric light bulb. A housing, which has a heat reflective surface, surrounds the light bulb and forms chutes for receiving broken and worn crayons. Molds are arranged beneath the chutes. When the crayons have melted, crayon material flows from the chutes to the molds under the influence of gravity. However, the light bulb that supplies radiant and convective heat appears to be freely accessible to a child who uses the apparatus.

A need exists for a safe and simple molding device for use by children. Desirably, the toy molding machine would protect children from the hot molten material and include safety shutdowns to interrupt electrical power if a potentially hazardous situation arises. More desirably, the toy molding machine would have stationary melting chambers and molds that cannot be tipped over during use.

SUMMARY OF THE INVENTION

The invention provides a toy molding machine, which is suitable for use by a child, having a stationary melting chamber, a gate for controlling the flow of molten material, and a mold in an enclosed area that is inaccessible to the child while the mold is being filled.

The toy molding machine comprises a stationary melting chamber to minimize the chance that molten material may be unexpectedly discharged from the melting chamber, either accidentally or as a result of poor judgment. An electrical heating element conducts heat to the melting chamber, and a warning light glows when electrical current flows to the heating element. A mold appropriate for forming a three-dimensional crayon or some other interesting object is provided in an enclosed area to which the child's access is intermittently restricted for safety reasons. For example, a remotely operated gate may alternately permit and prevent flow between the melting chamber and the mold. The child's access to the mold is restricted during those periods when the gate permits flow.

Some embodiments of the toy molding machine include a housing that substantially surrounds the melting chamber and the molding area to isolate the child from hot surfaces. The melting chamber is charged from outside of the housing through a filling port. A door provides access to the mold when the door is in an open position and prevents access to the molding area when the door is in a closed position.

After an on/off switch to an electrical power supply is activated, a thermostatic switch controls the temperature of the melting chamber. Various interlocks and shutdowns can also be incorporated to enhance the safe operation of the toy molding machine. For example, the door and the gate can be linked together, mechanically or otherwise, so that the door to the restricted area cannot be opened while the gate permits flow to the mold. Other examples include a high-temperature switch, a tilt switch or a door switch to interrupt the supply of electrical power to the heating element under certain circumstances.

Thermoplastics, resins and metal alloys may be melted and molded in the toy molding machine. One suitable charge stock for the melting chamber includes wax pieces obtained, for example, from broken crayons. A splash guard protects the child's fingers while he or she is loading the wax pieces into the melting chamber. Preferably, the melting chamber is located at a higher elevation than the mold, so that molten wax can flow to the mold by force of gravity while regulated by the remotely controlled gate. The broken crayons are effectively recycled when melted and re-formed in the three-dimensional crayon mold, and subsequently may be utilized for coloring purposes.

DETAILED DESCRIPTION OF PREFERRED EMBODIMENTS OF THE INVENTION

Figure 1:
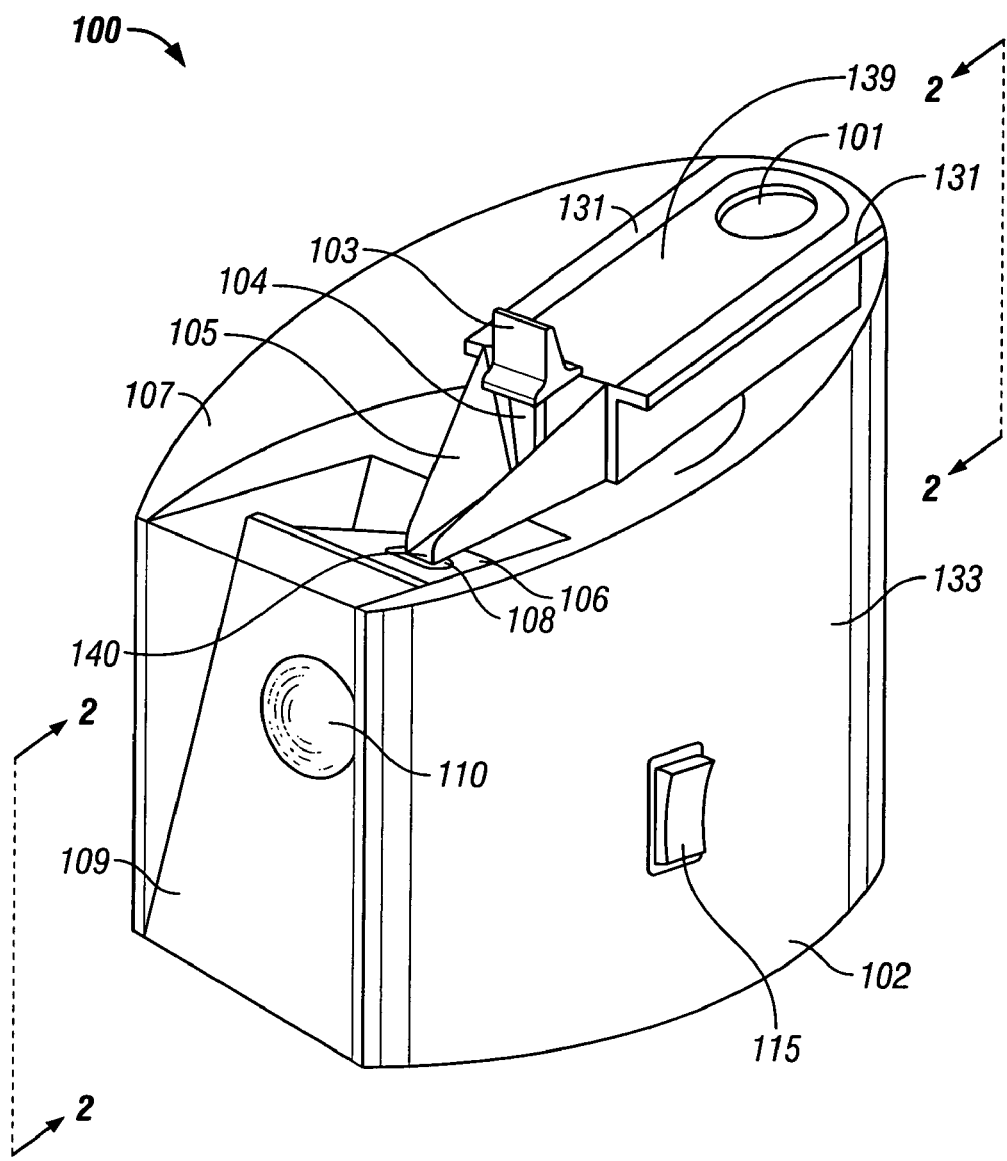
FIG. 1 is a perspective view of the invention.
Figure 2:
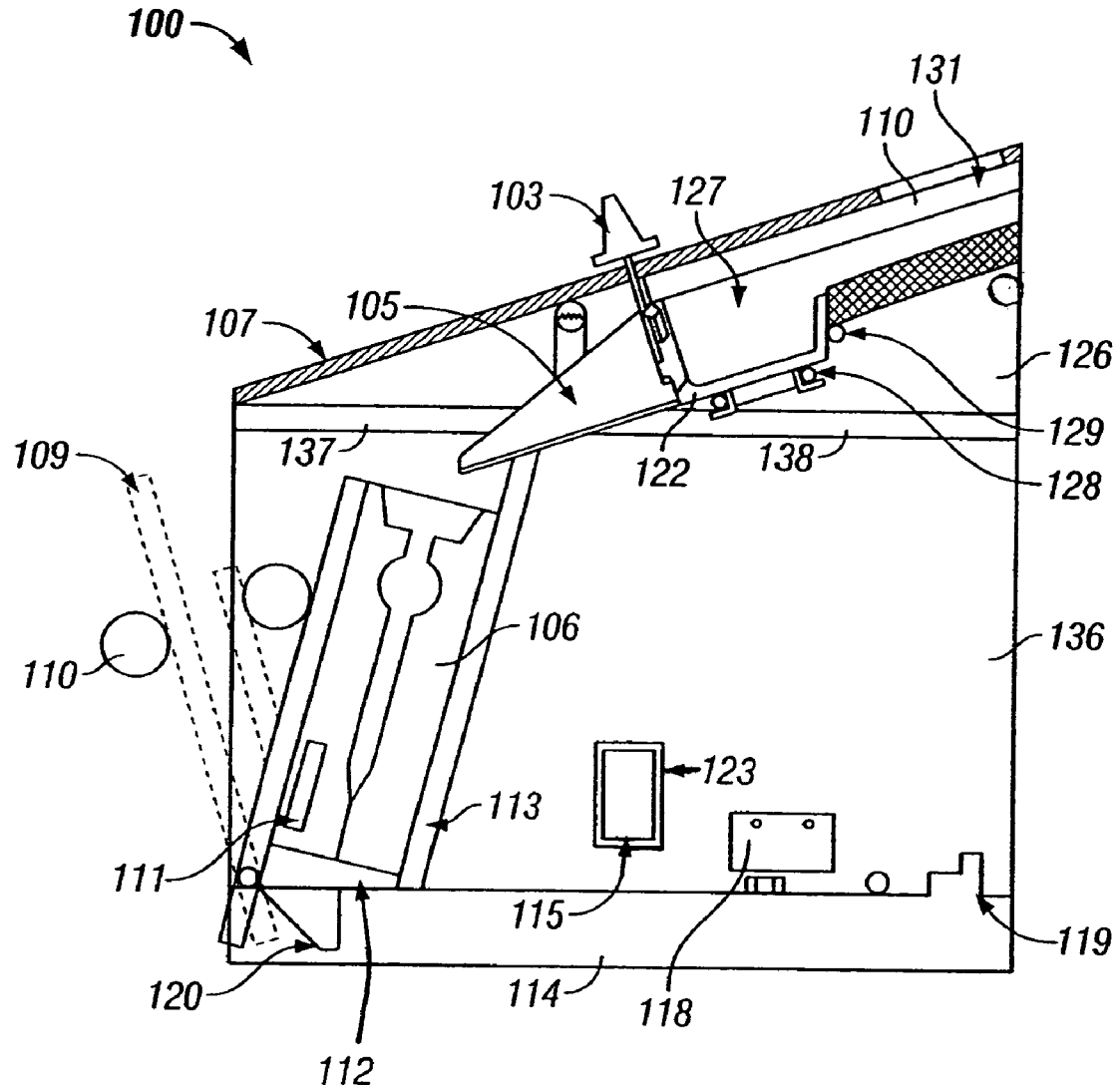
FIG. 2 is a cross-sectional view of the invention taken along plane 2—2 of FIG. 1.

In a preferred embodiment, the invention is a toy molding machine, such as crayon molder 100 depicted in FIGS. 1–2. FIG. 1 illustrates housing 133, which includes sidewall 102, cover 107 and door 109. Housing 133 is a unitary injection-molded plastic piece. Housing 133 substantially isolates a user from internal components that may be hot or electrified at some time during the molding process. Materials for melting, such as crayon pieces, are fed through a filling port 101 from the outside of housing 133 into fill chute 139. Splash guards 131 extend from chute 139 in order to prevent molten material from contacting a user. Preferably, chute 139 and splash guards 131 are composed of molded silicone rubber, shaped to receive melting pot 127. Gate 104 is a valve plug, which controls the flow of molten material within molder 100, and is operated from the outside of housing 133 by means of regulator 103. If and only if certain safety conditions are established, door 109 may be opened to provide access to the inside of housing 133.

Cover 107 is preferably transparent plastic so that the user (child or adult, as the case may be) can visually follow the progress of molten material from gate 104, along spout 105, through inlet 108 and into mold 106. Sidewall 102 is transparent or translucent so that the glow from warning light 123 (depicted in FIG. 2) can be seen through sidewall 102. Warning light 123 is preferably a warm reddish color to serve as a reminder that electrical power is flowing to heating element 128 (depicted in FIG. 2). Among other safety conditions, on/off switch 115 located in sidewall 102 must be switched to the "on" position in order for electrical power to flow to heating element 128.

Turning now to FIG. 2, filling port 101 receives material for melting (not shown) from the outside of housing 133. The material for melting (not shown) passes along a chute 139 and into the interior of melting pot 127. The material may be shaped for example, as beads, pellets or irregularly shaped broken pieces. Splash guard 131, constructed of a relatively heat resistant and durable silicone rubber, blocks the escape of solids and liquids from melting chamber 126. Melting pot 127 includes a heater pot casting 122 composed of die-cast aluminum partially surrounded by a molded silicone rubber heat shield (not shown). Melting pot 127 forms an outlet 140 leading to spout 105. Gate 104 is attached to spout 105 to control the flow of molten material from melting pot 127 to inlet 108 (commonly termed a "sprue opening") of mold 106.

Mold 106 is constructed of two or more separable silicone rubber parts for releasing the molded product upon completion of the molding process. Mold 106 is tall enough to produce standard size crayons and wide enough to produce other interesting objects. The mold parts are designed and assembled in accordance with well known principles of casting mold design. Door 109, backboard 113, base 114 and interior surfaces of sidewall 102 form mold chamber 112, which is sized and shaped to hold mold 106 of desired external dimensions. Clamping force to hold the mold parts together and correctly positioned within housing 133 is provided by door 109 in cooperation with the other members of mold chamber 126. Door 109 is composed of plastic and is connected by a hinge (not shown) to plastic base 114. Door stop 120 extends from base 114 adjacent the bottom of door 109. Knob 110 is used to open and close door 109.

Housing 133 includes molded plastic base 114 for mounting various internal components, backboard 113 and cover 107. The interior space of housing 133 is divided into: (1) melting chamber 126, which encloses melting pot 127 with its associated mechanical and electrical parts; (2) mold chamber 112, including door 109 and backboard 113; and (3) electrical component chamber 136, including on/off switch 115 and other electrical components. The three chambers, 126, 112 and 136, are defined by interior walls 113, 137 and 138. Preferably, melting chamber 126 and electrical component chamber 136 are not accessible to children. Access to mold chamber 112 is preferably restricted during certain periods of operation, such as while melting pot 127 is heating or mold 106 is filling with molten material.

Figure 3:
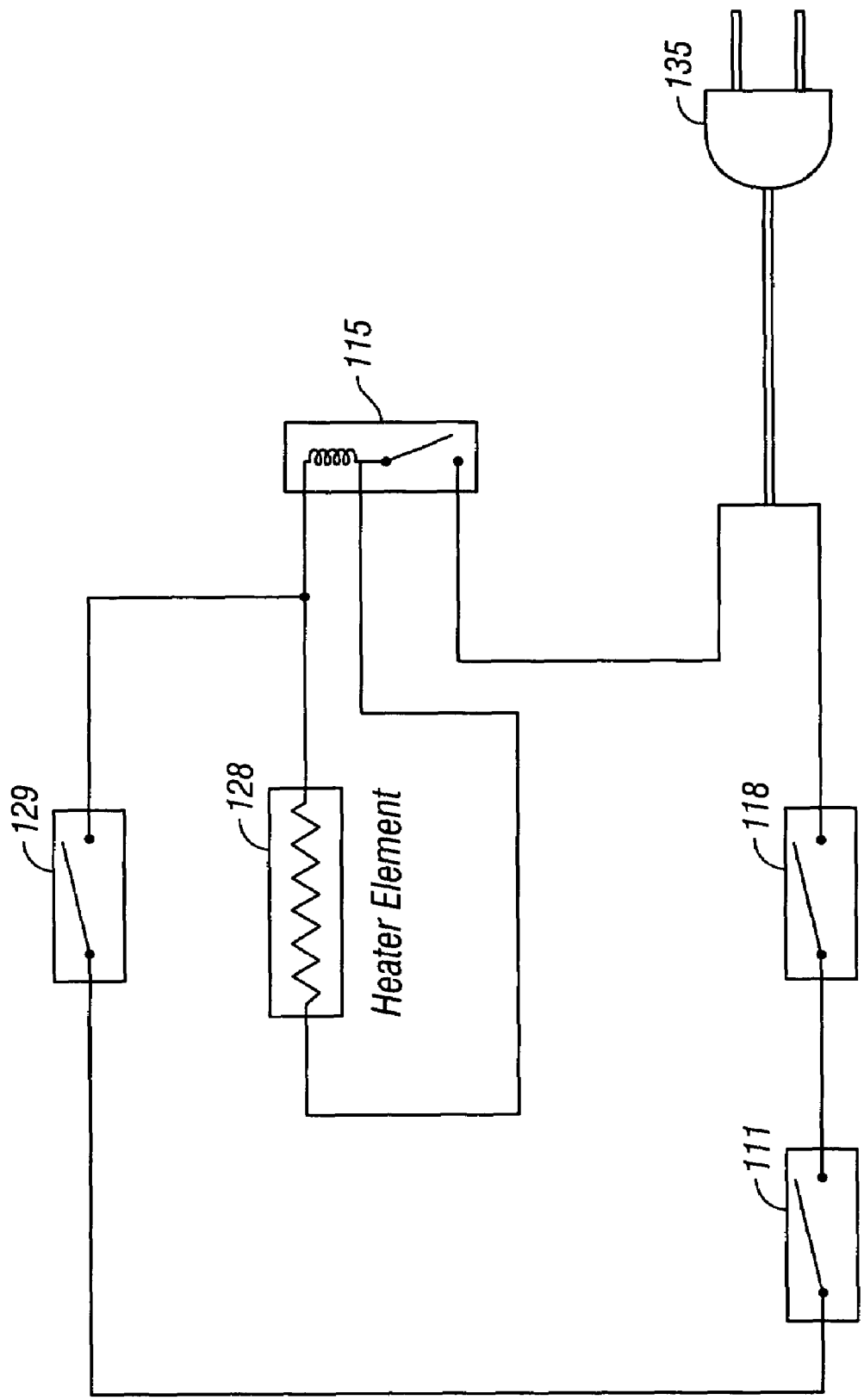
FIG. 3 is a schematic electrical diagram for the invention.

As shown in FIG. 3, a horseshoe shaped electrical heating element 128 partially surrounds melting pot 127 and conducts thermal energy to melting pot 127. Heating element 128 operates under the control of thermostatic switch 129, which senses the temperature of melting pot 127 and regulates electrical power flow to heating element 128 in order to control the temperature. Typically, thermostatic switch 129 is a bimetal switch set to open and close in the range of about 165 to about 180 degrees F.

Optional high-temperature switch (not shown) senses the temperature of electrical component chamber 136 and interrupts power to heating element 128 in the event that the temperature exceeds a predetermined value. Tilt switch 118 interrupts power if housing 133 rotates more than a predetermined value with respect to the vertical. Door switch 111 interrupts power if door 109 is not properly closed. All of these switches (115, 129, 118 and 111) must be in the "on" position in order for electrical power to flow to heating element 128.

Molder 100 receives electrical power from a conventional electrical supply system through a cable having a standard outlet connector 135, typically rated at 120 volts. Power cord contact block 119 mechanically anchors the cable to housing 133. On/off switch 115 with warning light 123 must be in the "on" or conducting position in order for any of the other electrical components to receive power. Thermostatic switch 129, heating element 128, optional high temperature switch (not shown), tilt switch 118 and door switch 111 are all wired in series, so all of these switches must simultaneously be in the conducting position in order for the heating element to receive power. Warning light 123, which is preferably incorporated into on/off switch 115, is in parallel with heating element 128 to indicate when heating element 128 is receiving power. Although warning light 123 may provide some insignificant amount of heat, as compared to heating element 128, warning light 123 is intended to be used for its visual warning effect only.

To operate molder 100, the user plugs it into a 120 volt power source, activates on/off switch 115, and puts pieces of broken or worn crayons equivalent in volume to about three to about six whole crayons of ordinary children's recreational size crayons into melting chamber filler tube 101. This volume of crayons is estimated to weigh about one to about three ounces in the Avoirdupois Weight system. This amount of crayon pieces usually melts within three minutes.

Once the crayon pieces have melted, the user moves regulator 103 to open gate 104, permitting the melted crayons to flow along die-cast aluminum spout 105 into mold 106. Approximately thirty seconds after the melted crayons enter mold 106, a newly formed, three-dimensional crayon, toy or other molded object can be removed from mold 106 by releasing door switch 111, opening door 109 and separating the halves of mold 106.

While embodiments of the invention have been described above, those of ordinary skill in the art will recognize that these embodiments may be modified and altered without departing from the spirit and scope of the invention. The embodiments described above are to be considered in all respects as illustrative and not restrictive.

The invention claimed is:

1. A device for molding crayons or toys, comprising:
   a housing defining a restricted access area having interior sidewalls;
   a door movable between open and closed positions that provides access to the restricted access area;
   a stationary melting chamber within the restricted access area;
   an electrically powered heating element adjacent the melting chamber;

a mold chamber in the restricted access area and connected to the melting chamber, the mold chamber defined in part by the door and interior sidewalls of the housing; and a mold having two parts within the mold chamber, where the two parts are held together in part by the door when it is in the closed position.

2. The device of claim 1 and a door switch that disconnects the electrical power from the heating element when the door is open.

3. The device of claim 1 and a gate for alternatively permitting and preventing flow between the melting chamber and the mold.

4. The device of claim 3 and an interlock between the gate and the door, which prevents the door from moving from the closed position when the gate is permitting flow.

5. The device of claim 1 and a warning light secured to the housing that signals when the heating element is activated.

6. The device of claim 1 and a regulator extending outwardly from the housing to permit or prevent flow of melted material from the melting chamber.

7. A device for recycling wax pieces, which comprises:

a housing defining a restricted access area;

a melting chamber in the restricted access area for producing liquid wax from wax pieces;

a flow path within the restricted access area and extending from the melting chamber for directing the flow of liquid wax;

a gate that controls the flow of liquid wax from the melting chamber to the flow path;

a mold connected to the flow path;

a door that provides access to the mold when the door is in an open position and prevents access to the mold when the door is in a closed position; and an interlock between the gate and the door, which prevents the door from moving from the closed position when the gate is permitting flow.

8. The device of claim 7 and a filler tube leading to the melting chamber for receiving a wax piece from outside the housing and for restricting access to the melting chamber.

9. The device of claim 7 and a heating element within the melting chamber.

10. The device of claim 7 and a regulator, which is accessible from outside the housing and directs the gate to permit or prevent flow.

11. The device of claim 7 in which the liquid wax flows primarily by gravity from the melting chamber to the mold along the flow path.

12. The device of claim 9 and a thermostatic switch for sensing the temperature of the melting chamber and controlling electricity to the heating element.

13. The device of claim 9 and a shutdown switch for interrupting electricity to the heating element when the housing is tilted.

14. The device of claim 9 and a switch for sensing the temperature of the heating element and interrupting electricity to the heating element when the temperature exceeds a given value.

15. The device of claim 9 and a door switch for interrupting electricity to the heating element when the door is not in the closed position.

16. A toy molding device for use with wax material, which comprises:

a stationary melting chamber;

an electrical heating element for heating the melting chamber;

a mold;

a housing substantially surrounding the melting chamber and the mold so as to restrict access by a user to the melting chamber and the mold, the housing including a door having an open position which provides access to the mold and a closed position which prevents access to the mold;

a gate having a open position which permits flow of the material between the melting chamber and the mold, and a closed position which prevents the flow of the material between the melting chamber and the mold; and an interlock that prevents the door from moving to the open position when the gate is in the open position.

17. The device of claim 16 and a micro switch that senses when the door is in the open position and interrupts the supply of electrical current to the electrical heating element.

18. The device of claim 16 and a tilt switch that senses when the housing inclines more than a predetermined amount from the vertical and then interrupts the supply of electrical current to the electrical heating element.

19. The device of claim 16 and a high-temperature switch that senses when the melting chamber temperature reaches a predetermined value and interrupts the supply of electrical current to the electrical heating element.

20. The device of claim 7 wherein the melting chamber is inclined to facilitate the flow of the liquid wax.

21. The device of claim 16 wherein the melting chamber is composed in part of molded silicone.

* * * * *